(12) United States Patent
Gong et al.

(10) Patent No.: US 9,817,251 B1
(45) Date of Patent: Nov. 14, 2017

(54) CARRIER DENSITY-BASED TUNABLE FILTER

(71) Applicant: Futurewei Technologies, Inc., Plano, TX (US)

(72) Inventors: Jianmin Gong, San Jose, CA (US); Xuejin Yan, Santa Clara, CA (US); Dekun Liu, Wuhan (CN); Liqiang Yu, Shenzhen (CN); Shengping Li, Wuhan (CN); Jing Hu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/144,559

(22) Filed: May 2, 2016

(51) Int. Cl.
| | |
|---|---|
| *H04B 10/00* | (2013.01) |
| *G02F 1/015* | (2006.01) |
| *H04J 14/02* | (2006.01) |
| *H04J 14/00* | (2006.01) |

(52) U.S. Cl.
CPC .......... *G02F 1/015* (2013.01); *H04J 14/0215* (2013.01); *G02F 2001/0151* (2013.01); *G02F 2201/346* (2013.01); *G02F 2203/055* (2013.01)

(58) Field of Classification Search
CPC ...... G02F 2203/055; G02F 1/015; G02F 1/21; G02F 1/218; G02F 2001/0151; G02F 2001/213
See application file for complete search history.

(56) References Cited

U.S. PATENT DOCUMENTS

| | | | | |
|---|---|---|---|---|
| 6,219,170 | B1* | 4/2001 | Kimura | G02F 1/015 349/113 |
| 6,396,083 | B1* | 5/2002 | Ortiz | B82Y 20/00 257/94 |
| 6,400,738 | B1 | 6/2002 | Tucker et al. | |
| 7,304,799 | B2 | 12/2007 | Ma et al. | |
| 2012/0162380 | A1* | 6/2012 | Cho | B82Y 20/00 348/47 |
| 2015/0207291 | A1* | 7/2015 | Rickman | H01S 3/083 372/20 |

OTHER PUBLICATIONS

Musca, et al., "Monolithic Integration of an Infrared Photon Detector With a MEMS-Based Tunable Filter," IEEE Electron Device Letters, vol. 26, No. 12, Dec. 2005, pp. 888-890.
Domash, et al., "Tunable and Switchable Multiple-Cavity Thin Film Filters," Journal of Lightwave Technology, vol. 22, No. 1, Jan. 2004, pp. 126-135.
Lequime, et al., "Toward Tunable Thin-Film Filters for Wavelength Division Multiplexing Applications," Applied Optics, vol. 41, No. 16, Jun. 1, 2002, pp. 3277-3284.

* cited by examiner

*Primary Examiner* — Daniel Dobson
(74) *Attorney, Agent, or Firm* — Conley Rose, P.C.

(57) ABSTRACT

An optical filter comprising a first distributed Bragg reflector (DBR) layer, a second DBR layer, and an intrinsic semiconductor layer positioned between the first DBR layer and the second DBR layer, with the intrinsic semiconductor layer providing a passband wavelength for the optical filter based on a carrier density of the intrinsic semiconductor layer.

19 Claims, 9 Drawing Sheets

CARRIER DENSITY-BASED TUNABLE FILTER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems increasingly use wavelength-division multiplexing (WDM) and time- and wavelength-division multiplexing (TWDM) to increase bandwidth capacity. In a WDM passive optical network (PON), multiple optical data signals of different wavelength ranges or channels are combined as a single multiplexed optical signal and transmitted through a single optical fiber. In a TWDM PON, a WDM PON may be overlaid on top of a time-division multiplexing (TDM) PON. In other words, different wavelengths are multiplexed together to share a single feeder fiber, and each wavelength is shared by multiple users using time-domain multiple access (TDMA).

Optical network units (ONUS) that operate in WDM PONs or TWDM PONs may benefit from wavelength-tunable optical filters. For example, an ONU may employ an optical tunable filter in a receive path to receive signals from a selectable wavelength channel or in a transmit path to transmit signals in a selectable wavelength channel.

SUMMARY

In one embodiment, the disclosure includes an optical filter comprising a first distributed Bragg reflector (DBR) layer, a second DBR layer, and an intrinsic semiconductor layer positioned between the first DBR layer and the second DBR layer, with the intrinsic semiconductor layer providing a passband wavelength for the optical filter based on a carrier density of the intrinsic semiconductor layer. In some embodiments, the disclosure also includes a refractive index of the intrinsic semiconductor layer that is configured to adjust based on an injection current amount in a forward bias direction from the first DBR layer to the second DBR layer, and/or wherein a refractive index of the intrinsic semiconductor layer is configured to adjust based on a reverse bias voltage amplitude between the first DBR layer and the second DBR layer, and/or wherein the first DBR layer comprises positive (p)-doped semiconductor layers, and the second DBR layer comprises negative (n)-doped semiconductor layers, and/or wherein a first layer of the p-doped semiconductor layers comprises a gallium aluminum arsenide (GaAlAs) material, and wherein a second layer of the p-doped semiconductor layers comprises a gallium arsenide (GaAs) material, and/or wherein a first layer of the n-doped semiconductor layers comprises a GaAs material, and wherein a second layer of the n-doped semiconductor layers comprises an aluminum arsenide (AlAs) material, and/or wherein the intrinsic semiconductor layer comprises a GaAs material, and/or further comprising a substrate layer, wherein the second DBR layer is disposed on top of the substrate layer, and/or wherein the optical filter comprises a diameter of about 10 micrometer ($\mu m$) to about 50 $\mu m$.

In another embodiment, the disclosure includes an optical device comprising a carrier density-based tunable filter comprising an input port configured to receive a first optical signal; a first reflector coupled to the input port, a spacer, a second reflector, wherein the spacer is positioned between the first reflector and the second reflector, and an output port coupled to the second reflector and configured to output a second optical signal, and an electrical circuit coupled across the first reflector and the second reflector, with the electrical circuit tuning a passband wavelength of the carrier density-based tunable filter to a pre-determined wavelength by injecting an electrical current across the first reflector and the second reflector so that a first portion of the first optical signal at the pre-determined wavelength passes through the carrier density-based tunable filter to output as the second optical signal at the output port. In some embodiments, the first reflector comprises a p-doped semiconductor material, wherein the spacer comprises an intrinsic semiconductor material, wherein the second reflector comprises a n-doped semiconductor material, and wherein the electrical circuit is further configured to inject the electrical current in a forward bias direction from the first reflector towards the second reflector, and/or wherein the first reflector comprises a p-doped semiconductor material, wherein the spacer comprises an intrinsic semiconductor material, wherein the second reflector comprises a n-doped semiconductor material, and wherein the electrical circuit is further configured to apply a voltage in a reverse bias direction from the second reflector towards the first reflector, and/or wherein the first optical signal is a focused beam comprising rays that substantially converge to a focal point, and/or wherein the input port is further configured to further receive the first optical signal so that the focal point is substantially aligned to about a center of the carrier density-based tunable filter, and/or further comprising a receiver coupled to the output port of the carrier density-based tunable filter, wherein the receiver is configured to receive the second optical signal, and wherein the input port of the carrier density-based tunable filter is further configured to couple to an optical network, and receive the first optical signal from the optical network, and/or further comprising a transmitter coupled to the input port of the carrier density-based tunable filter, wherein the transmitter is configured to generate the first optical signal, and wherein the output port of the carrier density-based tunable filter is further configured to couple to an optical network, and output the second optical signal to the optical network.

In yet another embodiment, the disclosure includes a method comprising selectively tuning, via an electrical circuit, a passband wavelength of a carrier density-based tunable filter to a pre-determined wavelength by controlling an amount of electrical current that passes through a positive-intrinsic-negative (p-i-n) junction of the carrier density-based tunable filter, directing an optical signal to an input port of the carrier density-based tunable filter, and selectively filtering, via the carrier density-based tunable filter, the optical signal so that a portion of the optical signal at the pre-determined wavelength passes through the carrier density-based tunable filter to an output port of the carrier density-based tunable filter. In some embodiments, the disclosure also includes wherein controlling the amount of electrical current comprises applying a forward bias voltage across the p-i-n junction of the carrier density-based tunable filter to inject the amount of electrical current in a forward bias direction, and/or wherein the selectively tuning further comprises controlling an amplitude of a reverse bias voltage across the p-i-n junction of the carrier density-based tunable filter, and/or wherein the optical signal comprises rays that converge to a focal point, and wherein the method further comprises substantially aligning the focal point of the optical signal to about a center point of the carrier density-based tunable filter.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
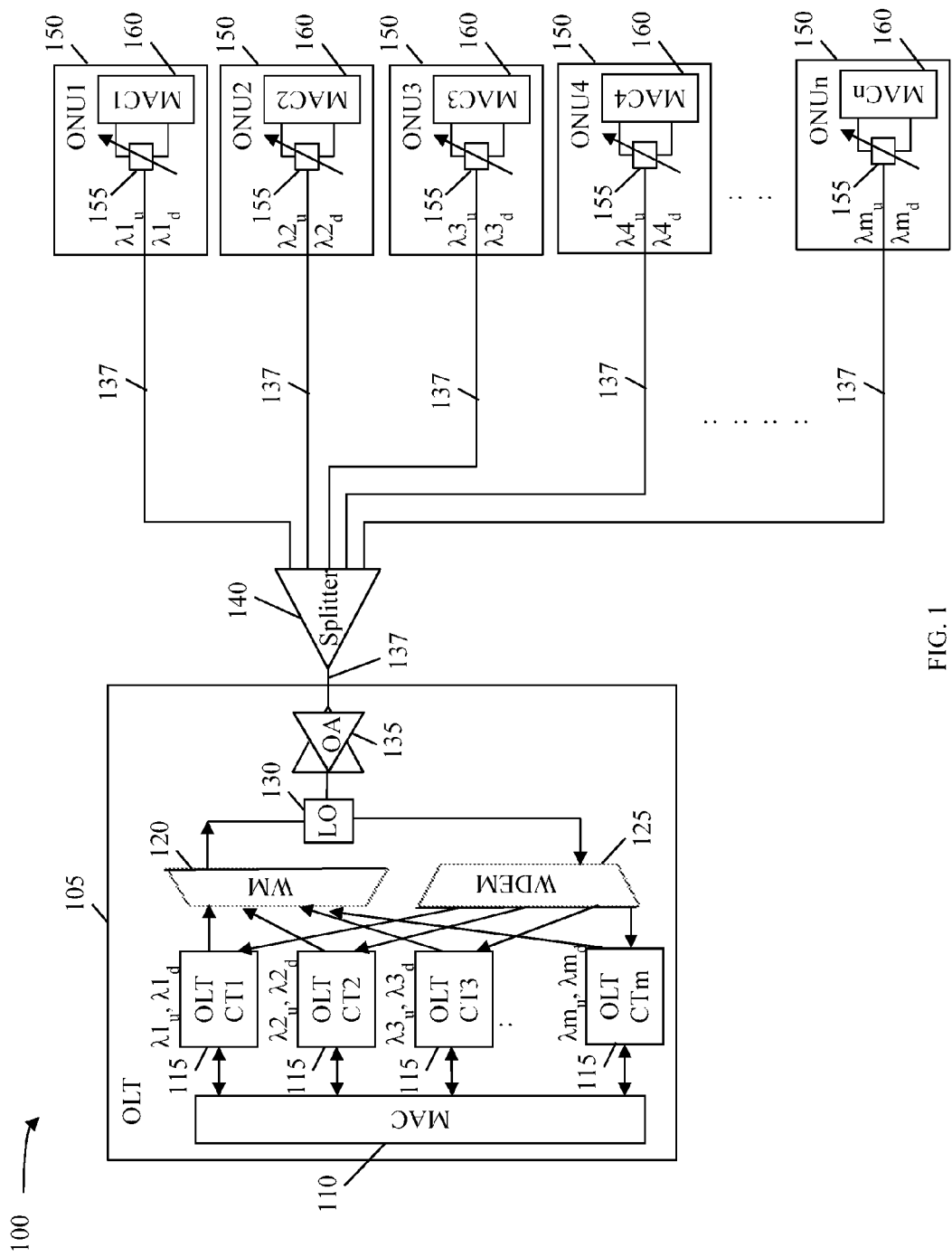
FIG. 1 is a schematic diagram of a TWDM PON.

FIG. 1 is a schematic diagram of a TWDM PON 100. The TWDM PON 100 is a communications network that does not require any active components to distribute data between an optical line terminal (OLT) 105 and a plurality of ONUs 150, depicted as ONU1 to ONUn, where n is a positive integer. Instead, the TWDM PON 100 uses passive optical components to distribute data between the OLT 105 and the ONUs 150. The TWDM PON 100 may adhere to any standard related to multiple-wavelength PONs. The TWDM PON 100 comprises the OLT 105, a splitter 140, and the ONUs 150.

The OLT 105 is any device configured to communicate with the ONUs 150 and a backbone network. For example, the backbone network may connect the TWDM PON 100 to the Internet. Specifically, the OLT 105 may act as an intermediary between the backbone network and the ONUs 150. For instance, the OLT 105 forwards data received from the backbone network to the ONUs 150 and forwards data received from the ONUs 150 to the backbone network. When the backbone network uses a network protocol that differs from the PON protocol used in the TWDM PON 100, the OLT 105 comprises a converter (not shown) that converts the backbone network protocol to the PON protocol. The OLT 105 converter may also convert the PON protocol into the backbone network protocol.

The OLT 105 comprises a media access control (MAC) module 110, a plurality of OLT channel terminations (CTs) 115, depicted as OLT CT1 to OLT CTm, a wavelength multiplexer (WM) 120, a wavelength demultiplexer (WDEM) 125, a local oscillator (LO) 130, and a bi-directional optical amplifier (OA) 135, where m is a positive integer. The MAC module 110 is any module suitable for performing protocol stack functions and interfacing with a physical layer. For example, the MAC module 110 may provide addressing and channel access control services to the physical layer, as described more fully below to determine upstream and downstream transmission schedules, and to perform packet address filtering operations.

A downstream schedule comprises downstream transmission opportunities for the OLT 105 to transmit downstream signals to the ONUs 150. An upstream schedule comprises upstream transmission opportunities for the ONUs 150 to transmit upstream signals to the OLT 105. A TWDM PON 100 transmission opportunity includes a wavelength channel and a time slot. In a transmit (or downstream) direction, the MAC module 110 instructs the OLT CTs 115 to transmit downstream signals to the ONUs 150 according to the downstream transmission schedules and to provide the upstream transmission schedules to the ONUs 150. In a receive (or upstream) direction, the MAC module 110 instructs the OLT CTs 115 to receive and process upstream signals transmitted by the ONUs 150 and perform packet processing functions. The OLT CTs 115 comprise transmitters (not shown) and receivers (not shown). The transmitters may comprise tunable lasers or other devices suitable for converting electrical signals into optical signals and transmitting the optical signals on separate downstream wavelength channels to the WM 120. The receivers may comprise photodiodes or other devices suitable for receiving optical signals from a plurality of upstream wavelength channels and converting the received optical signals into electrical signals. As shown, the downstream wavelength channels employ a first set of m wavelengths at $\lambda 1_d$ to $\lambda m_d$ and the upstream wavelength channels employ a second set of m wavelengths at $\lambda 1_u$ to $\lambda m_u$. Each OLT CT 115 employs a pair of upstream and downstream wavelength channels to communicate with one or more ONUs 150. The WM 120 is any suitable wavelength multiplexer, such as an arrayed waveguide grating (AWG). The WM 120 multiplexes the downstream wavelength channel signals generated by the OLT CTs 115 into a combined downstream signal and forwards the combined downstream signal to the LO 130. The LO 130 adds characteristics to the downstream combined signal in order for the ONUs 150 to properly extract the signals. The LO 130 then forwards the combined downstream signal to the OA 135, which amplifies the combined downstream signal as needed in order to forward the combined downstream signal to a splitter 140 via an optical fiber 137. The OA 135 may also receive a combined upstream signal from the splitter 140 via the optical fiber 137 and amplify the combined upstream signal as needed in order to forward the combined upstream signal to the WDEM 125. The WDEM 125 is similar to the WM 120 and de-multiplexes the combined upstream signal into multiple optical signals with different wavelength channels, then forwards the multiple optical signals to the OLT CTs 115.

The splitter 140 is any device suitable for splitting an optical signal into a plurality of optical signals in one transmission direction and combining a plurality of optical signals into a single signal in an opposite transmission direction. For example, in the downstream direction, the splitter 140 splits the combined downstream signal into n number of downstream optical signals, one for each ONU 150. Conversely, in the upstream direction, the splitter 140 receives a plurality of upstream signals from the ONUs 150, combines the received upstream signals into a combined upstream signal, and forwards the combined upstream signal to the OA 135.

The ONUs 150 are any devices suitable for communicating with the OLT 105. The ONUs 150 comprise wavelength tunable components 155 and MAC modules 160. The wavelength tunable components 155 comprise wavelength tunable transmitters (not shown) and wavelength tunable filters (not shown). The MAC modules 160 are similar to the MAC module 110.

The OLT 105 provides WDM capability by assigning each ONU 150 a downstream wavelength channel and an upstream wavelength channel for communicating with the OLT 105. The OLT 105 may also provide TWDM capability by dividing a wavelength channel into multiple time slots such that multiple ONUs 150 may communicate with the OLT 105 on a same wavelength channel. To implement a TWDM scheme, the OLT 105 associates a downstream wavelength channel and an upstream wavelength channel with each OLT CT 115 and assigns one or more ONUs 150 to operate on a pair of upstream and downstream wavelength channels in different time slots. The OLT 105 may employ various mechanisms and metrics to assign wavelength channels to the ONUs 150, as described more fully below. It should be noted that the TWDM PON 100 may be configured as shown or alternatively configured as determined by a person of ordinary skill in the art to achieve similar functionalities.

Figure 2:
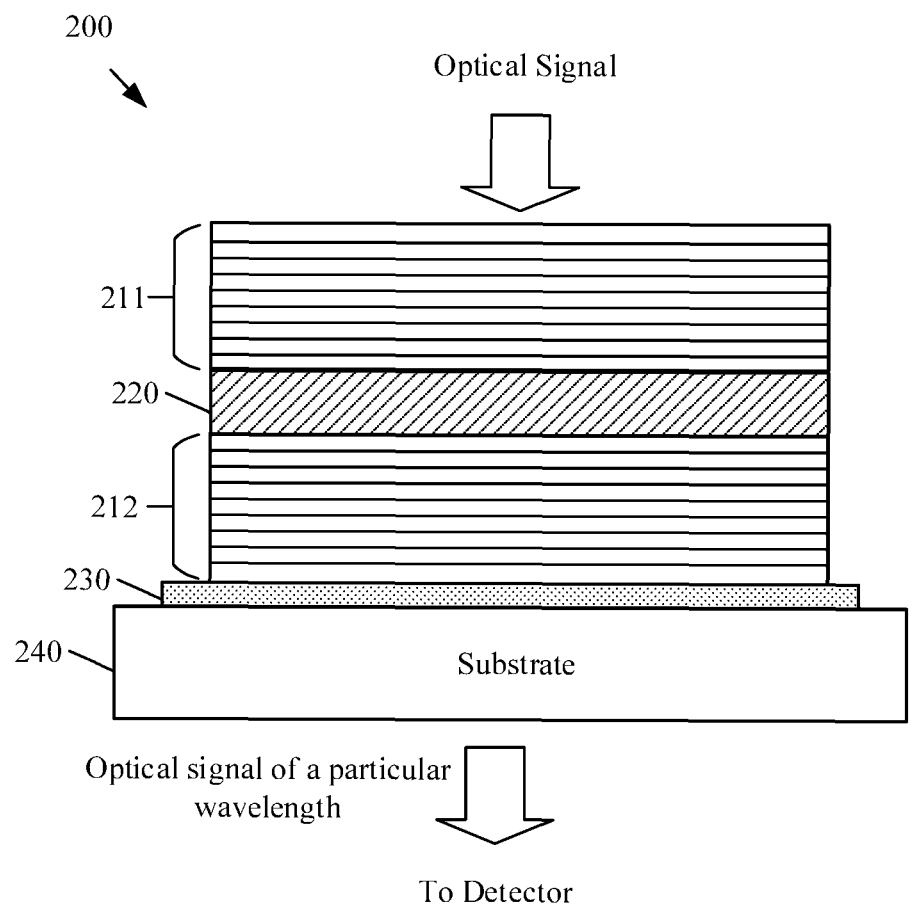
FIG. 2 is a schematic diagram of a thermally tunable filter.

FIG. 2 is a schematic diagram of a thermally tunable filter 200. The filter 200 may be employed by the ONUs 150 to select a wavelength for transmission or reception. The filter 200 is an example of the wavelength tunable components 155. The filter 200 comprises a first DBR 211, a spacer 220, a second DBR 212, a heater film 230, and a substrate layer 240. The first DBR 211 and the second DBR 212 are separated by the spacer 220. The second DBR 212 is disposed on top of the heater film 230. The heater film 230 is disposed on top of the substrate layer 240.

The first DBR 211 and the second DBR 212 each comprise a periodic multi-layer structure built from multiple layers of materials having refractive indices that alternate from layer to layer. For example, the periodic structures are constructed from about 20 to about 30 layers of dielectric materials such as amorphous silicon (a-silicon) and silicon nitride (SiNx). Dielectric materials are insulating materials with low electrical conductivity. The spacer 220 is constructed from a dielectric material such as a-silicon. The heater film 230 is constructed from a material such as zinc oxide (ZnO) or polysilicon. The substrate layer 240 is constructed from a material such as silicon.

The first DBR 211 and the second DBR 212 function as mirrors. In operation, when an optical signal enters the filter 200 through the first DBR 211, portions of the optical signal at some wavelengths are reflected by the second DBR 212, while another portion of the optical signal centered at a particular wavelength passes through the second DBR 212, depending on the refractive index of the spacer 220.

The refractive index of a material is known to vary as temperature varies. The passband wavelength of the filter 200 is tuned by controlling the temperature of the filter 200. The passband wavelength refers to the wavelength at the center of the passband of the filter 200. The heater film 230 heats the filter 200 to a suitable temperature range to shift the passband of the filter 200 to a desirable wavelength. For example, the filter 200 operates at a temperature range between about 70 degrees Celsius (° C.) to about 150° C. depending on the desirable passband wavelength. The heater film 230 is activated by passing a current through the heater film 230. Thus, the passband wavelength of the filter 200 is shifted by varying an amount of current that passes through the heater film 230. As an example, the filter 200 is designed to allow an optical signal comprising a wavelength of 1550 nanometer (nm) to pass through the filter 200. The optical signal is a collimated beam comprising parallel rays. A perfect collimated beam focuses at infinity. The heater film 230 and the substrate layer 240 are optically transparent in a tunable wavelength range of the filter 200. A detector may be coupled to the substrate to receive optical signals filtered by the filter 200.

Figure 3:
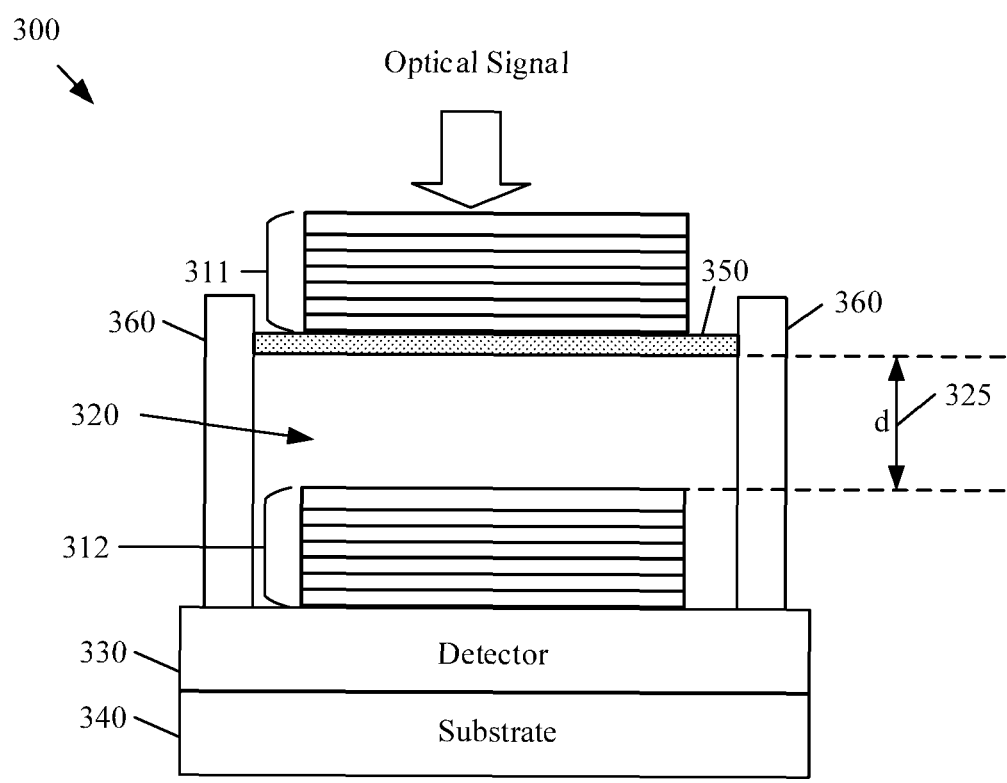
FIG. 3 is a schematic diagram of a microelectromechanical system (MEMS)-based tunable filter.

FIG. 3 is schematic diagram of a MEMS-based tunable filter 300. The filter 300 may be employed by the ONUs 150 to select a wavelength for transmission or reception. The filter 300 is an example of the wavelength tunable components 155. The filter 300 comprises a similar filter structure as the filter 200. However, the filter 300 operates based on mechanical tuning instead of thermal tuning. The filter 300 comprises a first DBR 311, a membrane layer 350, a spacer 320, a second DBR 312, a detector 330, a substrate layer 340, and cantilevers 360. The first DBR 311 and the second DBR 312 are similar to the first DBR 211 and the second DBR 212, respectively. The spacer 320 in this example is an air gap. The substrate layer 340 is similar to the substrate layer 240. The first DBR 311 is disposed on the membrane layer 350 supported by the cantilevers 360, which are disposed on the detector 330. The detector 330 is disposed on the substrate layer 340. The membrane layer 350 is constructed from a material such as SiN. The detector 330 may be any device configured to detect optical signals.

The signal path of the filter 300 is similar to the filter 200. However, the filter 300 is tuned by applying a bias voltage across the first DBR 311 and the second DBR 312. The application of the voltage causes the membrane layer 350 to vibrate and changes a separation distance 325 (denoted as "d") between the first DBR 311 and the second DBR 312. The separation distance 325 determines the wavelengths that may pass through the second DBR 312 to the detector 330. Similar to the filter 200, an optical signal enters the filter 300 from the first DBR 311 and a portion of the optical signal at a particular wavelength as determined by the separation distance 325 passes through the second DBR 312. The optical signal may be in an infrared (IR) band or any other suitable wavelength band. The filtered optical signal is detected by the detector 330.

Although the filters 200 and 300 provide wavelength tunability, the filters 200 and 300 comprise several drawbacks. The filter 200 comprises a slow tuning response. For example, the time required to heat the filter 200 to a suitable operating temperature may vary between about a few milliseconds (ms) to a few seconds (secs). As such, the filter 200 may not satisfy timing requirements of high-speed optical systems. In addition, the heating of the filter 200 may generate thermal noise, which may degrade system performance. The filter 300 is sensitive to vibration, and thus requires precise control. The manufacturing time and cost of MEMS-based components are high. Thus, the filter 300 may be too expensive for use in ONUs.

Disclosed herein are various embodiments of a carrier density-based tunable filter that provides a fast tuning response time and reduced cost. The disclosed filter is constructed from semiconductor materials instead of dielectric materials. The passband wavelength of the filter is tuned by varying the carrier density of the filter. In an embodiment, the disclosed filter comprises a spacer positioned between a first reflector and a second reflector. The spacer is constructed from an intrinsic or un-doped semiconductor layer. The first reflector is constructed from p-doped semiconductor layers. The second reflector is constructed from n-doped semiconductor layers. A carrier density of the spacer is modified by injecting a current between the first reflector and the second reflector. The refractive index of the spacer varies with the carrier density. Thus, the passband wavelength of the filter is controlled by varying the amount of current that flows between the first reflector and the second reflector. The injection current may be a forward bias current or a reverse bias voltage. In an embodiment, the size of the filter is reduced when the filter is applied to a focused beam waist. A focused beam comprises rays that converge to a focal point. In addition, the amount of injected current may be reduced when the filter is applied to a focused beam waist because the filter effective diameter is reduced. The disclosed filter is suitable for use in any optical applications.

Figure 4:
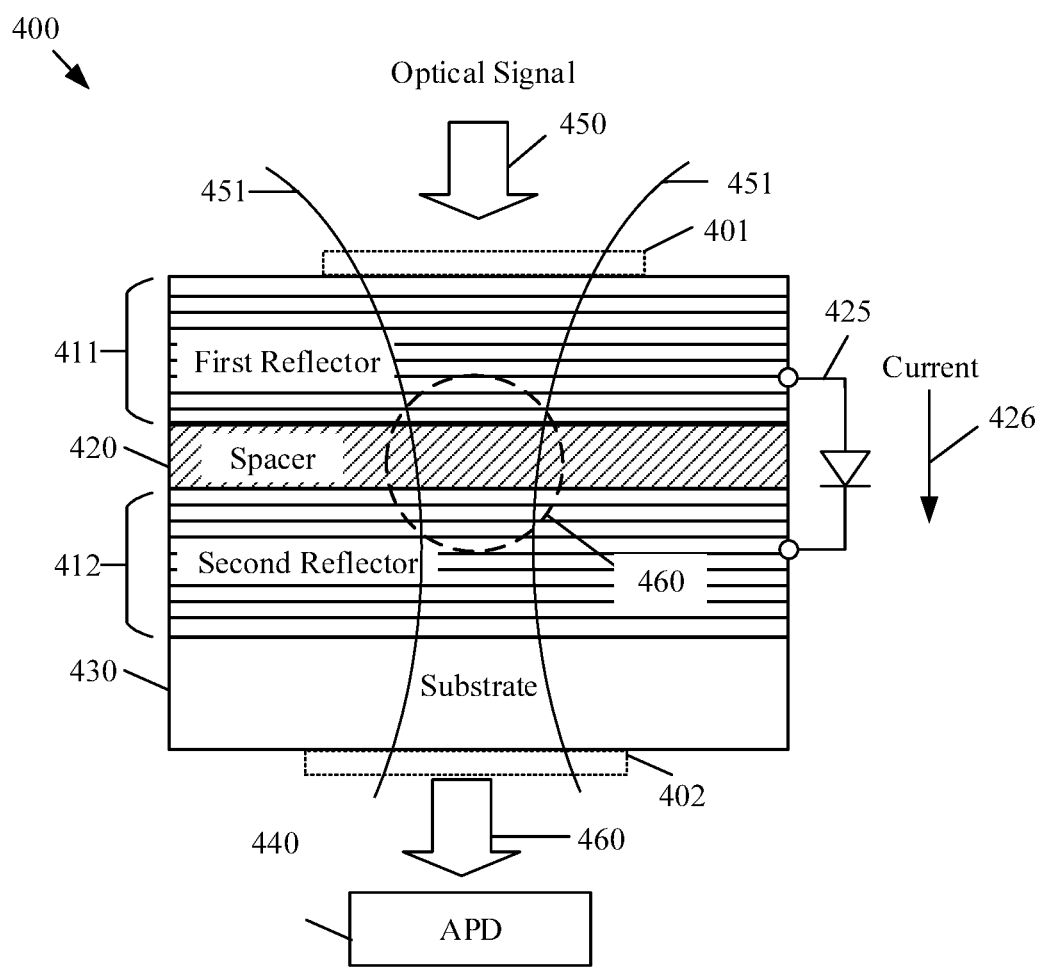
FIG. 4 is a schematic diagram of a carrier density-based tunable filter according to an embodiment of the disclosure.

FIG. 4 is a schematic diagram of a carrier density-based tunable filter 400 according to an embodiment of the disclosure. The filter 400 may be employed by the ONUs 150 to select a downstream transmission wavelength for reception. The filter 400 is an example of the wavelength tunable components 155. The filter 400 comprises a first reflector 411, a spacer 420, a second reflector 412, and a substrate layer 430. The first reflector 411 and the second reflector 412 are separated by the spacer 420. The second reflector 412 is disposed on top of the substrate layer 430. The filter 400 further comprises an input port 401 coupled to the first reflector 411 and an output port 402 coupled to the substrate layer 430. The first reflector 411 and the second reflector 412 are DBRs each comprising a periodic multi-layer structure built from multiple layers of materials having refractive indices that alternate from layer to layer. The first reflector 411 is constructed from p-doped semiconductor materials. For example, a first layer of the first reflector 411 comprises GaAlAs and a next layer of the first reflector 411 comprises GaAs. The second reflector 412 is constructed from n-doped semiconductor materials. For example, a first layer of the second reflector 412 comprises AlAs and a next layer of the second reflector 412 comprises GaAs. The spacer 420 is constructed from an intrinsic type or un-doped solid semiconductor material such as GaAs. The substrate layer 430 is constructed from a semiconductor material such as GaAs.

The first reflector 411 forms a p-region. The spacer 420 forms an intrinsic (i)-region. The second reflector 412 forms a n-region. Thus, the first reflector 411, the spacer 420, and the second reflector 412 together form a p-i-n junction 425. The refractive index of the spacer 420 varies with the carrier density of the spacer 420. The transmission characteristics or the passband wavelength of the filter 400 is dependent on the refractive index of the spacer 420. The filter 400 modifies the free carrier density of the spacer 420 by injecting a current 426 across the p-i-n junction 425 in a forward bias direction from the first reflector 411 to the second reflector 412. The current 426 injected across the p-i-n junction 425 is referred to as an injection current or a tuning current. Alternatively, the filter 400 modifies the refractive index of the spacer 420 by applying a reversed bias voltage across the p-i-n junction 425 from the second reflector 412 to the first reflector 411. In operation, when an optical signal 450 enters the filter 400 via the input port 401, a portion of the optical signal 450 centered at a particular wavelength as determined by the refractive index of the spacer 420 passes through the second reflector 412 and output an optical signal 460 via the output port 402.

Both the size of the filter 400 and the amount of injection current 426 required for wavelength tuning may be reduced when the filter 400 is applied to a focused beam waist instead of collimated beams. As shown, an optical signal 450 is a focused beam comprising rays that propagate along the propagation paths 451, where the rays converge to a center point or a focal point in a region 460. In some examples, the optical signal 450 is a focused beam comprising rays that substantially converge to a focal point. The tuning rate of the filter 400 for a specific injection current is dependent on the effective volume of the spacer 420. When using a focused beam, the light-pass diameter of the filter 400 is small. Thus, the current-pass and light-pass area of the filter 400 may be reduced. For example, the current-pass and light-pass area may be slightly larger than the light-pass diameter. Therefore, the volume of the spacer 420 may also be reduced. The details of applying a focused optical signal to the filter 400 are described more fully below. The reduction in size and current enable the filter 400 to be fabricated using vertical-cavity surface-emitting laser (VCSEL) procedures. Thus, the filter 400 may be mass produced at a low cost. In an embodiment, the filter 400 is a thin disk, which may be easily mounted onto an avalanche photodetector (APD) 440 as shown in FIG. 4 or any photodetector. Therefore, the assembly cost for the filter 400 is low.

The filter 400 is suitable for use in optical receivers and optical transmitters. When the filter 400 is employed in an optical receiver, the optical receiver configures the filter 400 to receive optical signals of a selectable wavelength via the APD 440. When the filter 400 is employed in an optical transmitter, the optical transmitter configures the filter 400 to transmit optical signals at a selectable wavelength and the APD 440 is used to feed back a portion of the transmitted optical signal to the optical transmitter for measurements and controls.

Since the filter 400 is tuned by varying the carrier density of the spacer 420, the filter 400 eliminates the need for heating as in the filter 200 and moving parts as in the filter 300. Therefore, the filter 400 may be more reliable than the filters 200 and 300. In addition, the carrier density of the spacer 420 may be changed quickly via current injection. For example, the filter 400 comprises a tuning response time less than about 10 nanoseconds (ns). Further, the carrier density of the spacer 420 may be controlled precisely to meet a wide range of wavelengths via current injection. Thus, the filter 400 may be configured to meet the requirements of a wide range of applications. The spacer 420, the first reflector 411, and the second reflector 412 may be alternatively configured to further meet application requirements.

Figure 5:
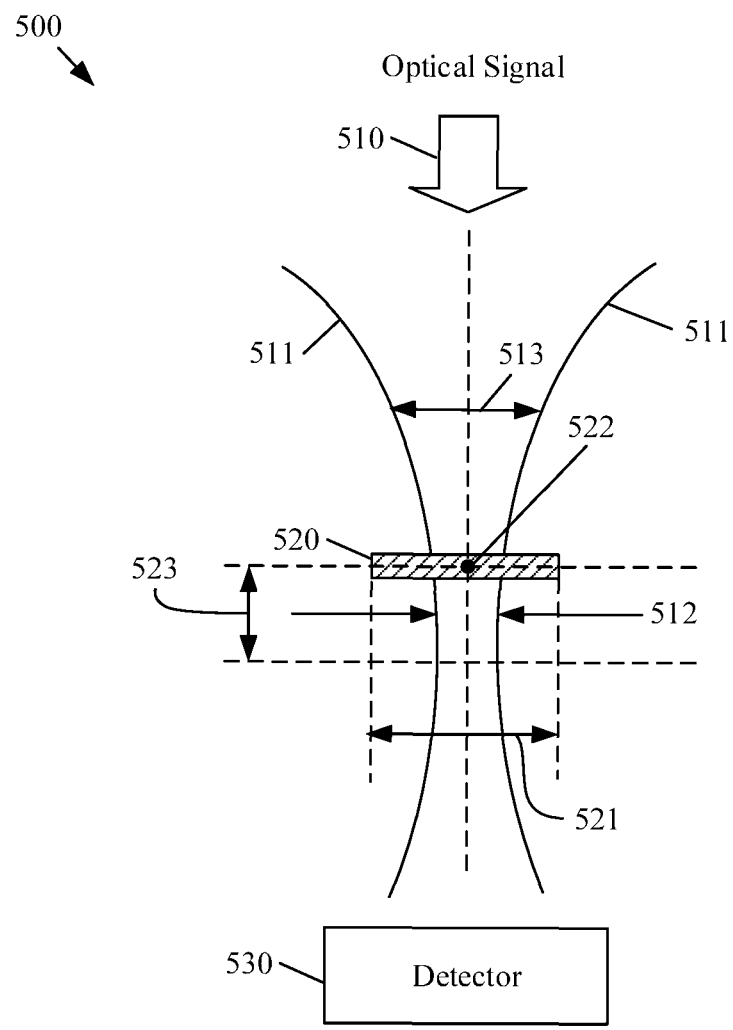
FIG. 5 is a schematic diagram of an optical filtering scheme according to an embodiment of the disclosure.

FIG. 5 is a schematic diagram of an optical filtering scheme 500 according to an embodiment of the disclosure. In the scheme 500, an optical signal 510 enters a carrier density-based tunable filter 520 similar to the filter 400. The filter 520 passes a portion of the optical signal 510 at a particular wavelength to a detector 530 similar to the APD 440. The optical signal 510 is a focused beam comprising a shape as shown by the curves 511. The curve 511 of the focused beam of a given wavelength is determined by a beam waist 512. The beam waist 512 corresponds to a focal point at which rays of the optical signal 510 converge, where the diameter of the optical signal is at a minimum. As before, the optical signal 510 may comprise a focused beam comprising rays that substantially converge to a focal point. For example, the beam waist of a focused beam may be about 1 μm. As shown, the filter 520 is positioned at about the position of the beam waist 512. In order for the filter 520 to operate effectively, a diameter 521 of the filter 520 is designed to be greater than the beam waist 512. For example, a diameter of about 10 μm to about 50 μm is sufficient for use with a focused beam with a beam waist less than about 1 μm.

Although the filter 520 may be applied to a collimated beam, the waist or the width of a collimated beam is significantly greater than a focused beam. For example, a collimated beam may comprise a width of about 100 μm. Thus, the diameter 521 of the filter 520 is required to be in the order of a few hundred micrometers for use with a collimated beam. In addition, the amount of injection current such as the current 426 required to change the carrier density of the filter 520 depends on the active size of the filter 520. The active size refers to the size of an area that allows free carrier density change and light to pass through. For example, when the filter 520 comprises a diameter 521 in an order of μm, a few milliamps of injection current is sufficient to tune the passband wavelength of the filter 520. However, when the filter 520 comprises a diameter 521 in an order of hundred micrometers, a few amperes (A) of injection current is required to tune the passband wavelength of the filter 520. Thus, the size of the filter 520 and the amount of injection current are reduced when the filter 520 is applied to focused beams instead of collimated beams. In some embodiments, the filter 520 is a thin disk and the size of the filter 520 is dependent on the width of the filter 520.

The transmission spectrum of the filter 520 varies as the position of the filter 520 varies with respect to the beam waist 512, as described more fully below. The scheme 500 provides the optimum performance when the beam waist 512 of the optical signal 510 is substantially aligned to a center point 522 of the filter 520, which is referred to as on-focus. However, when the filter 520 is placed at an offset 523 of about +/−100 μm from the beam waist 512 of the optical signal 510, which is referred to as off-focus, the filter 520 may still provide sufficient performance depending on the applications.

Figure 6:
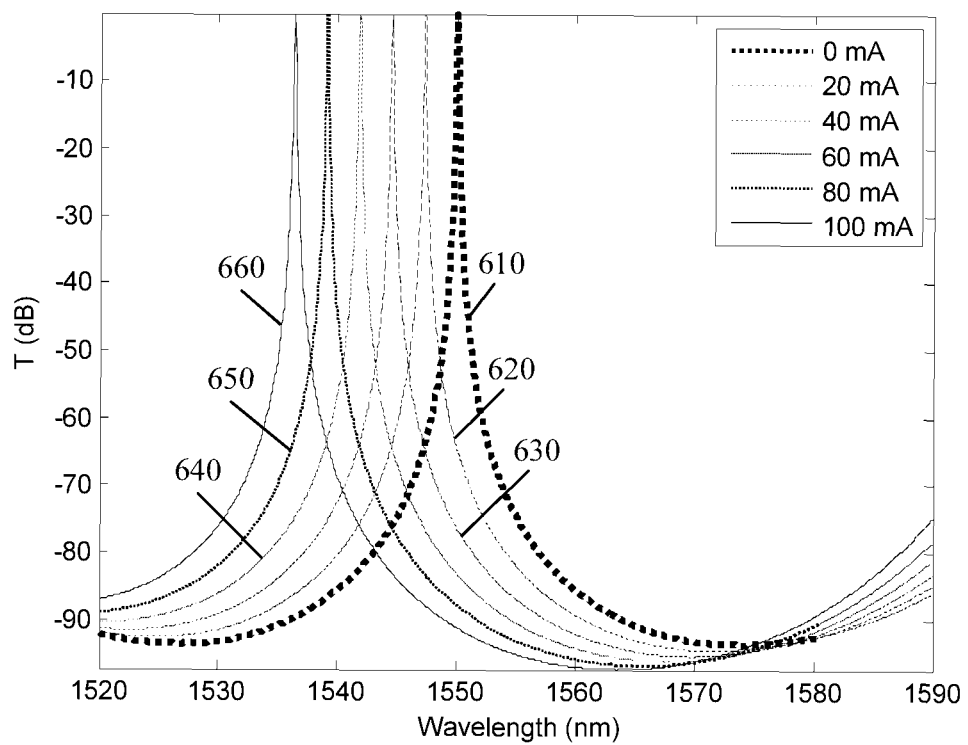
FIG. 6 is a graph illustrating transmission characteristics of a carrier density-based tunable filter according to an embodiment of the disclosure.

FIG. 6 is a graph 600 illustrating transmission characteristics of a carrier density-based tunable filter such as the filters 400 and 520 according to an embodiment of the disclosure. The x-axis represents optical signal wavelength in units of nm. The y-axis represents optical filter transmissivity in units of decibel (dB). For example, the filter may be designed with a nominal passband wavelength of about 1550 nm. The curves 610, 620, 630, 640, 650, and 660 show the transmission spectra of the filter when a current of 0, 20, 40, 60, 80, 100 milliampere (mA) is injected across a p-i-n junction such as the p-i-n junction 425 of the filter, respectively. As shown by the curve 610, the passband wavelength remains unchanged with 0 mA injection current. As the injection current varies from about 20 mA to about 100 mA as shown by the curves 620-660, the passband wavelength varies from about 1548 nm to about 1535 nm.

Figure 7:
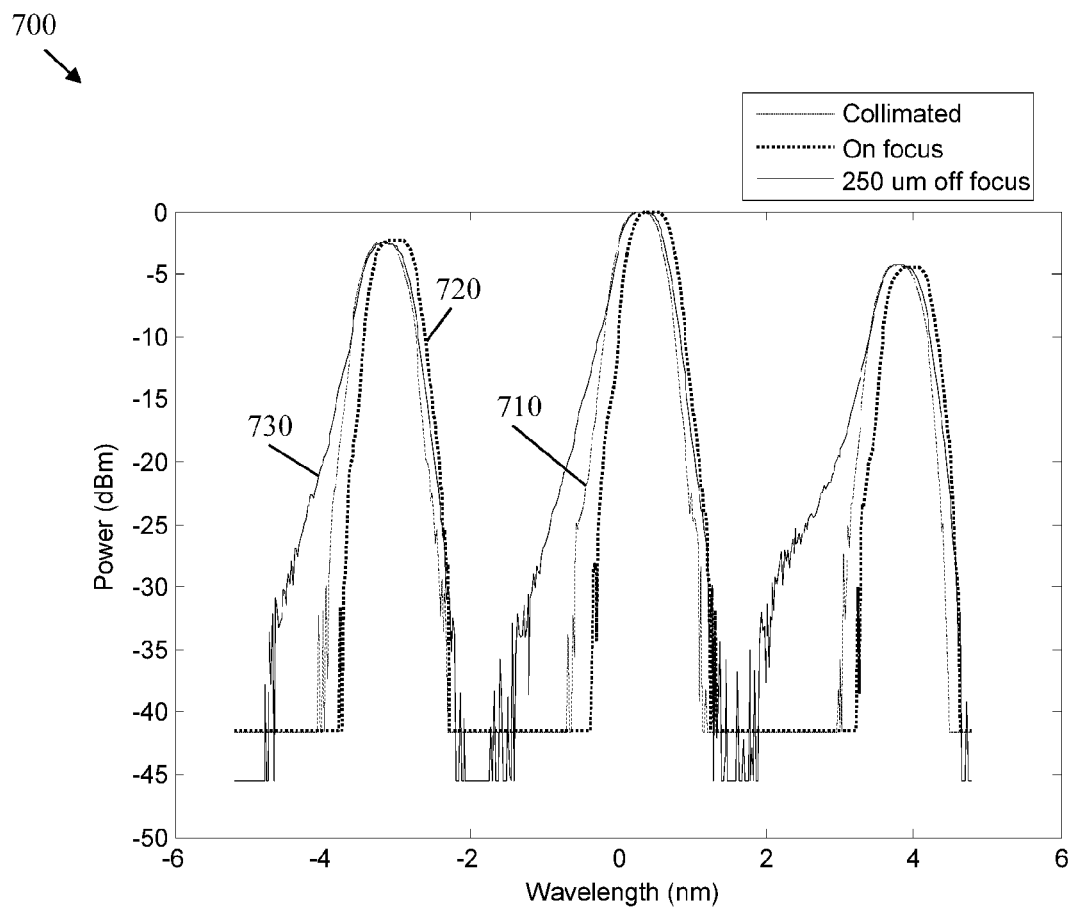
FIG. 7 is a graph comparing transmission spectra of a carrier density-based tunable filter under different input conditions according to an embodiment of the disclosure.

FIG. 7 is a graph 700 comparing transmission spectra of a carrier density-based tunable filter such as the filters 400 and 520 under different input conditions according to an embodiment of the disclosure. The x-axis represents optical signal wavelength in units of nm. The y-axis represents required bias power in units of decibel-milliwatt (dBm). The curve 710 shows the transmission spectrum of the filter when the input of the filter is a collimated beam. The curve 720 shows the transmission spectrum of the filter when the input of the filter is a focused beam positioned at an on-focus position, where the beam waist such as the beam waist 512 of the beam aligns to the center, such as the center 522 of the filter. The curve 730 shows the transmission spectrum of the filter when the input of the filter is a focused beam positioned at an off-focus position where the beam waist of the beam is positioned at an offset such as the offset 523 of about 250 μm from the center of the filter. The curve 710 is generated with a filter comprising a diameter of an order of a few hundred μm to accommodate the collimated beam. The curves 720 and 730 are generated with a filter comprising a diameter of an order of a few lam. Comparing the curves 710 and 720, the focused beam at an on-focus position comprises a similar spectral shape as the collimated beam when applied through the filter. Comparing the curves 720 and 730, the focused beam at an on-focus position comprises a narrower passband than the focused beam at an off-focus position. Depending on the applications, the width of the passband may affect performance.

Figure 8:
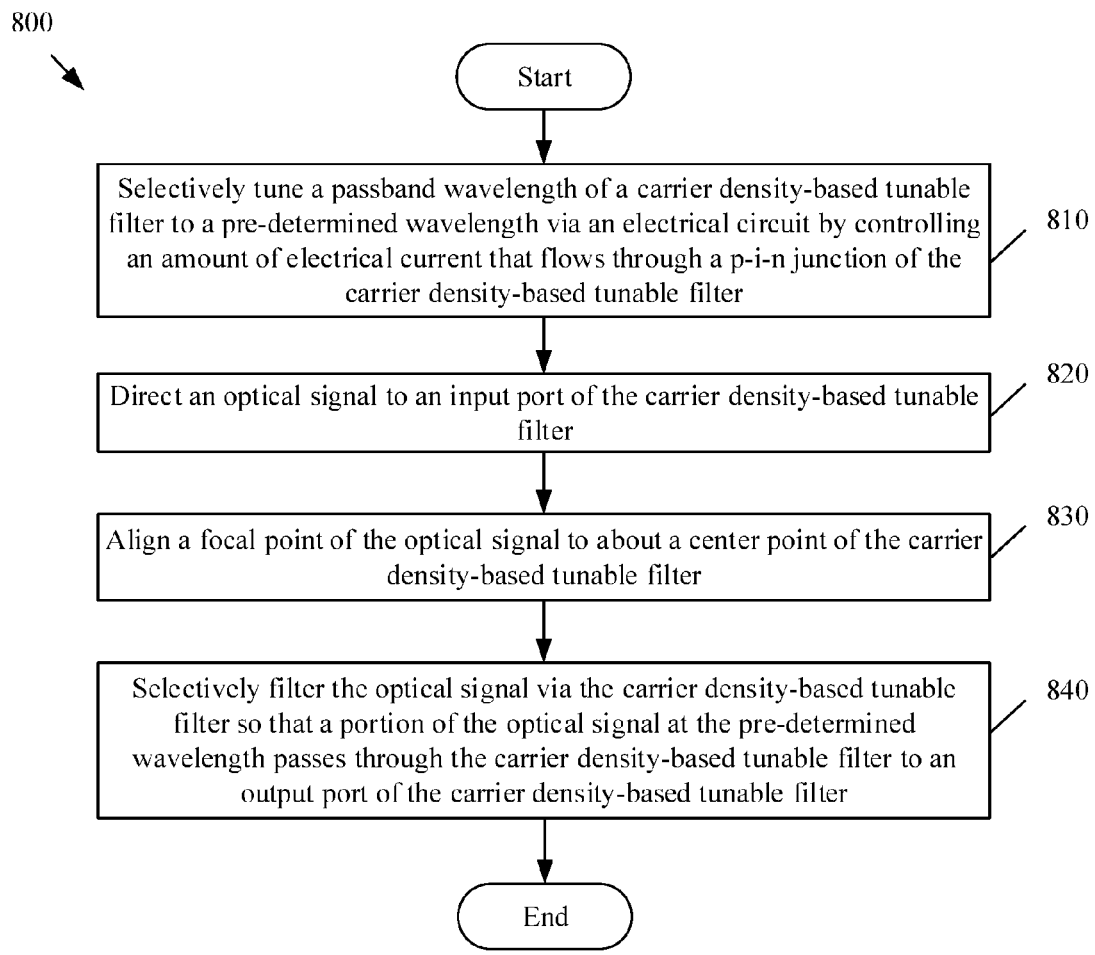
FIG. 8 is a flowchart of a method of optical filtering according to an embodiment of the disclosure.

FIG. 8 is a flowchart of a method 800 of optical filtering according to an embodiment of the disclosure. The method 800 is implemented by an optical receiver or an optical transmitter that employs a carrier density-based tunable filter such as the filters 400 and 520 when receiving or transmitting an optical signal, respectively. The method 800 employs similar mechanisms as described in the scheme 500. At step 810, a passband wavelength of a carrier density-based tunable filter is selectively tuned to a pre-determined wavelength via an electrical circuit by controlling an amount of electrical current such as the current 426 that passes through a p-i-n junction similar to the p-i-n junction 425 of the carrier density-based tunable filter. At step 820, an optical signal is directed to an input port such as the input port 401 of the carrier density-based tunable filter. For example, the optical signal is similar to the optical signal 450, which is a focused beam. At step 830, a focal point of the optical signal is aligned to about a center point such as the center point 522 of the carrier density-based tunable filter. At step 840, the optical signal is selectively filtered via the carrier density-based tunable filter so that a portion of the optical signal at the pre-determined wavelength passes through the carrier density-based tunable filter to an output port such as the output port 402 of the carrier density-based tunable filter. It should be noted that the step 830 may be optional depending on the type of optical signal input at the filter and/or requirements of the application in use.

Figure 9:
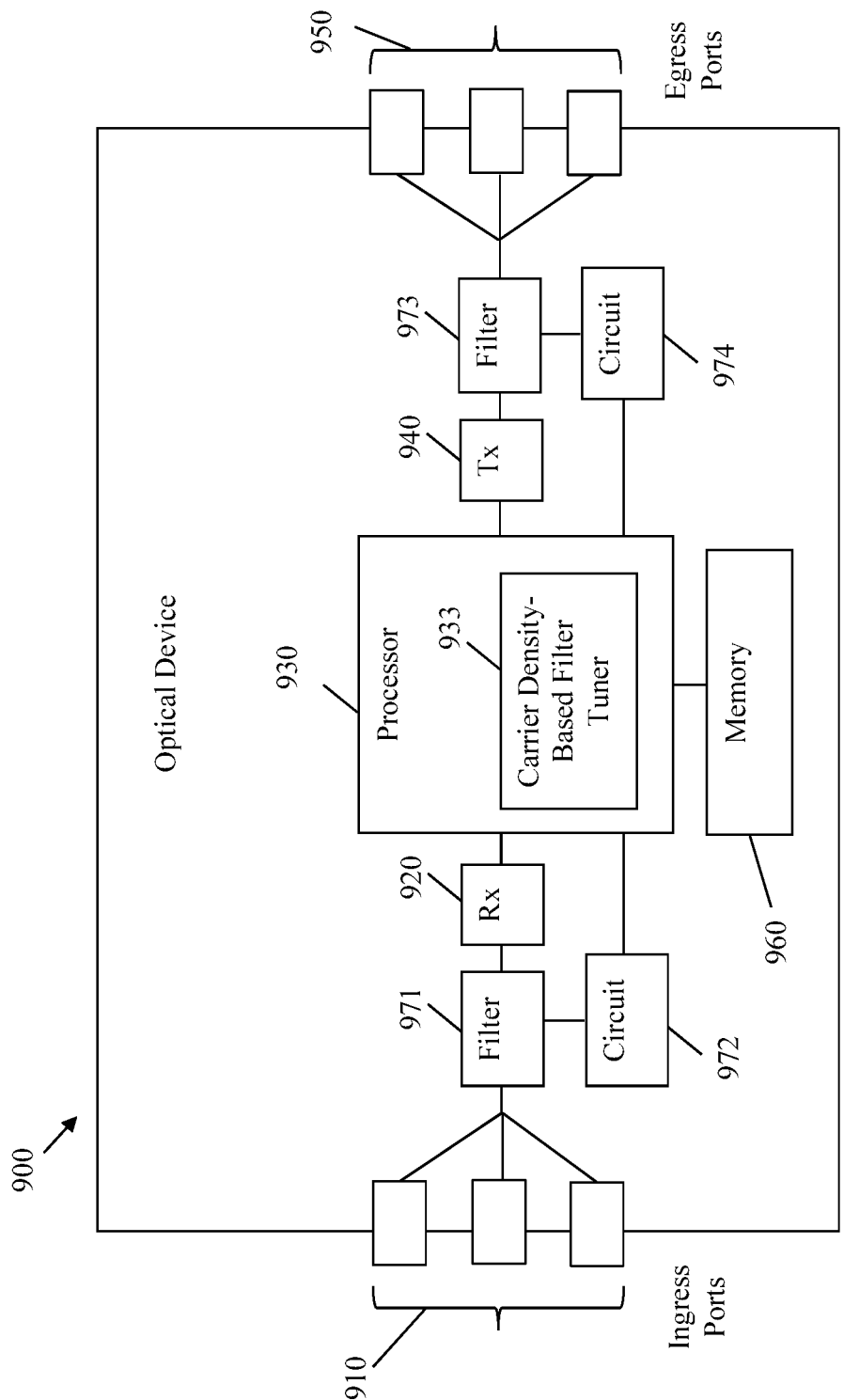
FIG. 9 is a schematic diagram of an optical device according to an embodiment of the disclosure.

FIG. 9 is a schematic diagram of an optical device 900 according to an embodiment of the disclosure. The optical device 900 is suitable for implementing the disclosed embodiments as described above. The optical device 900 comprises ingress ports 910 and receiver units (Rx) 920 for receiving data; a processor, logic unit, or central processing unit (CPU) 930 to process the data; transmitter units (Tx) 940 and egress ports 950 for transmitting data; and a memory 960 for storing the data. The optical device 900 further comprises a first filter 971 similar to the filters 400 and 520; a first circuit 972 for tuning a passband wavelength of the first filter 971; a second filter 973 similar to the filters 400 and 520; and a second circuit 974 for tuning a passband wavelength of the second filter 973. The first circuit 972 and the second circuit 974 may be any suitable electrical circuits for injecting current such as the current 426 across p-i-n junctions such as the p-i-n junction 425 of the first filter 971 and the second filter 973. The optical device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, first filter 971, receiver units 920, transmitter units 940, second filter 973, egress ports 950, and memory 960. The processor 930 comprises a carrier density-based filter tuner 933.

The carrier density-based filter tuner 933 assists in implementing the disclosed embodiments described above. For instance, the carrier density-based filter tuner 933 implements the control of the first circuit 972 and the second circuit 974 for tuning passband wavelengths of the first filter 971 and the second filter 973. The inclusion of the carrier density-based filter tuner 933 therefore provides a substantial improvement to the functionality of the optical device 900 and effects a transformation of the optical device 900 to a different state. Alternatively, the carrier density-based filter tuner 933 is implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and non-volatile and may be read-only memory (ROM), random-access memory (RAM), ternary content-addressable memory (TCAM), and static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical filter comprising:
a first distributed Bragg reflector (DBR) layer;
a second DBR layer; and
an intrinsic semiconductor layer positioned between the first DBR layer and the second DBR layer, with the intrinsic semiconductor layer providing a passband wavelength for the optical filter based on a carrier density of the intrinsic semiconductor layer.

2. The optical filter of claim 1, wherein a refractive index of the intrinsic semiconductor layer is configured to adjust based on an injection current amount in a forward bias direction from the first DBR layer to the second DBR layer.

3. The optical filter of claim 1, wherein a refractive index of the intrinsic semiconductor layer is configured to adjust based on a reverse bias voltage amplitude between the first DBR layer and the second DBR layer.

4. The optical filter of claim 1, wherein the first DBR layer comprises positive (p)-doped semiconductor layers, and the second DBR layer comprises negative (n)-doped semiconductor layers.

5. The optical filter of claim 4, wherein a first layer of the p-doped semiconductor layers comprises a gallium aluminum arsenide (GaAlAs) material, and wherein a second layer of the p-doped semiconductor layers comprises a gallium arsenide (GaAs) material.

6. The optical filter of claim 4, wherein a first layer of the n-doped semiconductor layers comprises a gallium arsenide (GaAs) material, and wherein a second layer of the n-doped semiconductor layers comprises an aluminum arsenide (AlAs) material.

7. The optical filter of claim 1, wherein the intrinsic semiconductor layer comprises a gallium arsenide (GaAs) material.

8. The optical filter of claim 1, further comprising a substrate layer, wherein the second DBR layer is disposed on top of the substrate layer.

9. The optical filter of claim 1, wherein the optical filter comprises a diameter of about micrometer ($\mu$m) to about 50 $\mu$m.

10. An optical device comprising:
a carrier density-based tunable filter comprising:
an input port configured to receive a first optical signal;
a first reflector coupled to the input port;
a spacer;
a second reflector, wherein the spacer is positioned between the first reflector and the second reflector; and
an output port coupled to the second reflector and configured to output a second optical signal; and
an electrical circuit coupled across the first reflector and the second reflector, with the electrical circuit tuning a passband wavelength of the carrier density-based tunable filter to a pre-determined wavelength by injecting an electrical current across the first reflector and the second reflector so that a first portion of the first optical signal at the pre-determined wavelength passes through the carrier density-based tunable filter to output as the second optical signal at the output port.

11. The optical device of claim 10, wherein the first reflector comprises a positive (p)-doped semiconductor material, wherein the spacer comprises an intrinsic semiconductor material, wherein the second reflector comprises a negative (n)-doped semiconductor material, and wherein the electrical circuit is further configured to inject the electrical current in a forward bias direction from the first reflector towards the second reflector.

12. The optical device of claim 10, wherein the first reflector comprises a positive (p)-doped semiconductor material, wherein the spacer comprises an intrinsic semiconductor material, wherein the second reflector comprises a negative (n)-doped semiconductor material, and wherein the electrical circuit is further configured to apply a voltage in a reverse bias direction from the second reflector towards the first reflector.

13. The optical device of claim 10, wherein the first optical signal is a focused beam comprising rays that substantially converge to a focal point.

14. The optical device of claim 13, wherein the input port is further configured to further receive the first optical signal so that the focal point is substantially aligned to about a center of the carrier density-based tunable filter.

15. The optical device of claim 10, further comprising a receiver coupled to the output port of the carrier density-based tunable filter, wherein the receiver is configured to receive the second optical signal, and wherein the input port of the carrier density-based tunable filter is further configured to:
    couple to an optical network; and
    receive the first optical signal from the optical network.

16. The optical device of claim 10, further comprising a transmitter coupled to the input port of the carrier density-based tunable filter, wherein the transmitter is configured to generate the first optical signal, and wherein the output port of the carrier density-based tunable filter is further configured to:
    couple to an optical network; and
    output the second optical signal to the optical network.

17. A method comprising:
    selectively tuning, via an electrical circuit, a passband wavelength of a carrier density-based tunable filter to a pre-determined wavelength by controlling an amount of electrical current that passes through a positive-intrinsic-negative (p-i-n) junction of the carrier density-based tunable filter;
    directing an optical signal to an input port of the carrier density-based tunable filter, wherein the optical signal comprises rays that converge to a focal point;
    substantially aligning the focal point of the optical signal to about a center point of the carrier density-based tunable filter; and
    selectively filtering, via the carrier density-based tunable filter, the optical signal so that a portion of the optical signal at the pre-determined wavelength passes through the carrier density-based tunable filter to an output port of the carrier density-based tunable filter.

18. The method of claim 17, wherein controlling the amount of electrical current comprises applying a forward bias voltage across the p-i-n junction of the carrier density-based tunable filter to inject the amount of electrical current in a forward bias direction.

19. The method of claim 17, wherein the selectively tuning further comprises controlling an amplitude of a reverse bias voltage across the p-i-n junction of the carrier density-based tunable filter.

* * * * *